A. BREITSTEIN.
RELIEF VALVE.
APPLICATION FILED FEB. 16, 1915.

1,274,378.

Patented Aug. 6, 1918.

Witness

Inventor
Abraham Breitstein
By C. A. Snow & Co.
Attorney

UNITED STATES PATENT OFFICE.

ABRAHAM BREITSTEIN, OF RICHMOND, VIRGINIA.

RELIEF-VALVE.

1,274,378.  Specification of Letters Patent.  Patented Aug. 6, 1918.

Application filed February 16, 1918. Serial No. 217,604.

*To all whom it may concern:*

Be it known that I, ABRAHAM BREITSTEIN, a citizen of the United States, residing at Richmond, in the county of Henrico and State of Virginia, have invented a new and useful Relief-Valve, of which the following is a specification.

This invention relates to relief valves for water pipes, one of its objects being to provide a valve which can be attached readily to a pipe and which does not require a threading tool or the services of a skilled mechanic in order to apply it to a pipe.

Another object is to provide a device of this character which is simple in construction, cheap to manufacture and will not get out of order readily.

A further object is to provide a relief valve which when properly applied, will prevent a water pipe from bursting during freezing of its contents.

With the foregoing and other objects in view which will appear as the description proceeds, the invention consists of certain novel details of construction and combinations of parts which will be hereinafter more fully described and pointed out in the claims, it being understood that changes may be made within the scope of the claims without departing from the spirit of the invention.

In the accompanying drawings the preferred form of the invention has been shown.

In said drawings—

Figure 1:
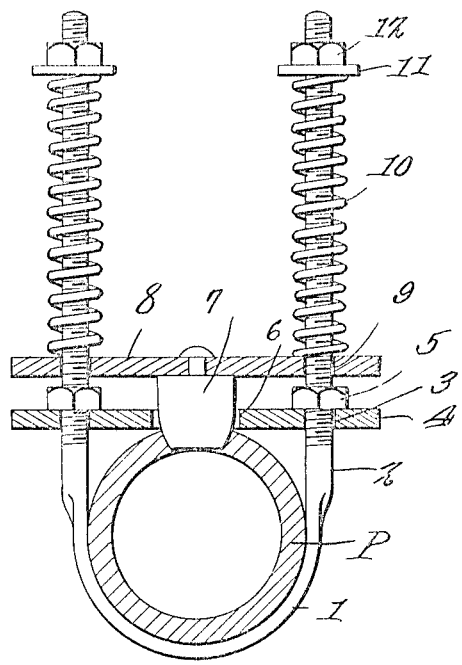
Figure 1 is a transverse section through a pipe having the present improvements applied thereto.
Figure 2:
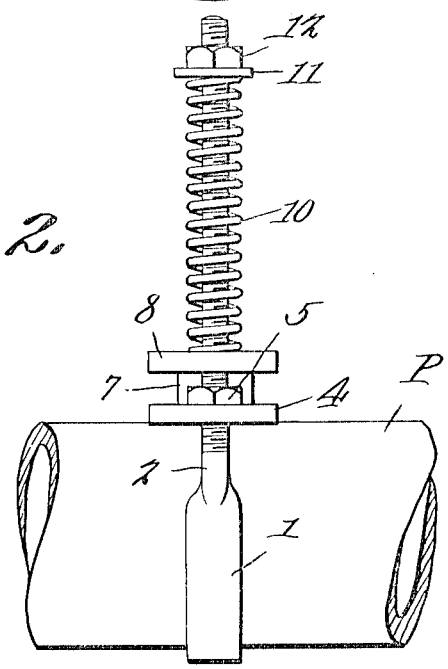
Fig. 2 is a side elevation.

Referring to the figures by characters of reference, 1 designates a metal strap or clip adapted to straddle a pipe P and provided at its terminals with parallel threaded stems 2 which extend loosely through holes 3 in a holding plate 4. Nuts 5 engage the stems 2 and are adapted to be adjusted against the plate 4 so as to bind the plate tightly against the pipe P. An opening 6 is formed in the plate 4 at the center thereof and is adapted to receive loosely, a plug 7 of rubber or the like which is attached to the center of a follower 8. This follower has holes 9 near the ends thereof through which the stems 2 extend loosely and bearing against the follower are coiled springs 10 which are mounted on the stems 2 and press, at their outer ends against washers 11 held in place by nuts 12 which are screwed on the end portions of the stems 2.

In using the device the clip is placed in engagement with the pipe P and held in place by tightening the plate 4 onto the pipe. A hole H, preferably tapered and of less diameter than the hole 6 is first drilled in the pipe P and when the plate 4 is in position, the hole 6 therein will lie concentric with the hole H. Plug 7 will extend into and seal the hole H and will be held against the water pressure by the springs 10. When expansion takes place in the pipe due to freezing, however, the plug will be lifted off of its seat and bursting of the pipe will therefore be prevented.

What is claimed is:—

1. A relief valve for water pipes including a clip for straddling a pipe and having threaded stems, a holding plate adjustably mounted on the stems and having an aperture, a spring pressed follower slidable on the stems, and a sealing plug carried by the follower and normally projecting through said aperture.

2. A relief valve for water pipes including a clip for straddling a pipe and having a threaded stem at each end, a holding plate adjustably mounted on the stems and having an aperture, a follower slidably mounted on the stems, a plug carried by the follower and normally projecting through the aperture, and adjustably mounted springs on the stems for holding the follower in normal position.

3. The combination with a water pipe having an aperture, of a clip straddling the pipe, threaded stems projecting from the clip, a holding plate adjustably mounted on the stems and clamping on the pipe, said plate having an aperture concentric with and of greater diameter than the aperture in the pipe, a follower slidably mounted on the stems, a sealing plug thereon and normally projecting through the holding plate and into the aperture in the pipe, and yielding means for pressing the follower and plug to their normal positions.

In testimony that I claim the foregoing as my own, I have hereto affixed my signature in the presence of two witnesses.

ABRAHAM BREITSTEIN.

Witnesses:
   JENNY ROSENTHAL,
   MAX X ROSENTHAL.
      (his mark)